United States Patent
Minarik et al.

[19]

[11] Patent Number: 6,028,885

[45] Date of Patent: Feb. 22, 2000

[54] FREQUENCY HOPPING RADIO TRANSMITTER APPARATUS AND METHOD PROVIDING VERY HIGH COMMUNICATION SECURITY

[75] Inventors: Ronald William Minarik, Lutherville; Kenneth Martin Schmidt; Benjamin Frederick Weigand, both of Ellicott City; Walter Mathias Dirndorfer, Linthicum, all of Md.

[73] Assignee: Northrop Grumman Corporation, Los Angeles, Calif.

[21] Appl. No.: 08/938,790

[22] Filed: Sep. 26, 1997

[51] Int. Cl.[7] .................................................... H04B 1/713
[52] U.S. Cl. ............................. 375/202; 375/307; 455/22
[58] Field of Search ...................................... 375/200, 202, 375/307; 455/22, 112

[56] References Cited

U.S. PATENT DOCUMENTS

| | | | |
|---|---|---|---|
| 5,548,839 | 8/1996 | Caldwell et al. | 455/312 |
| 5,673,323 | 9/1997 | Schotz et al. | 381/2 |
| 5,712,628 | 1/1998 | Phillips et al. | 340/825.54 |
| 5,732,107 | 3/1998 | Phillips et al. | 375/296 |
| 5,867,535 | 2/1999 | Phillips et al. | 375/295 |

*Primary Examiner*—Stephen Chin
*Assistant Examiner*—Lenny Jiang

[57] ABSTRACT

A radio transmitter is structured to provide frequency hopping of transmitted leakage signals in addition to RF hopping of the RF output signal. A digital computer controls a digital tuner, a TLO, a FLO, and an IF unit to provide the RF hopping and to provide digital-tuner frequency hopping and IF hopping thereby enabling the frequency hopping of transmitted leakage digital tuner and IF signals.

12 Claims, 8 Drawing Sheets

FREQUENCY HOPPING RADIO TRANSMITTER APPARATUS AND METHOD PROVIDING VERY HIGH COMMUNICATION SECURITY

BACKGROUND OF THE INVENTION

1. Field of the Invention

The present invention relates to radio communication security, and more particularly, to digital radio apparatus and methods in which radio frequency hopping is used to provide security against interception of communications.

2. Description of the Prior Art

In the prior art, radio communication security has been provided by a technique called radio frequency hopping. In this scheme, as applied to digital radios, the transmitted radio frequency (RF) signal is typically encrypted to provide a first level of communication security. Further, the RF signal is radiated at different carrier RFs which are time sequenced, usually at a fixed hopping rate in accordance with a predefined pattern known to the intended RF receiver but not known to possible intercept receivers, thereby providing another level of communication security.

In particular, various RF communication systems, including SINGCARS, HAVEQUICK versions, JTIDS, etc., have employed frequency hopping or direct sequence spreading to achieve a spread RF spectrum at the tunable last transmitter stage and thereby to prevent intercept receivers from receiving transmitted information. These systems operate on the premise that a receiver must know the proper spreading pattern to receive the transmitted signal.

RF signal hopping provides communication security in the sense that an intercept receiver may detect a portion of a communication at a particular RF but cannot detect a whole communication which is transmitted by a series of hopped RFs.

With the hopping set of a transmitter not being known to an interceptor, a wide-band receiver can be used as an interceptor receiver to cover the entire spectrum over which the transmitted signal is hopped, but sensitivity is dramatically reduced (perhaps by 40 to 50 dB below a narrow band receiver). Additionally, the wide-band receiver will receive extraneous signals making it difficult or impossible to distinguish the target signal to be intercepted from the extraneous signals.

In any case, communication security may be seriously breached in the prior art through interception of transmitted leakage intermediate frequency (IF) or modulated baseband signals. Generally, transmitter RF circuitry is provided with filtering and conditioning functions which minimize these leakage signals, and the leakage signals are thus typically weak. However, the leakage signals are fixed in frequency and often have sufficient strength to be detected, especially by narrow-band receivers and especially over relatively short transmission distances.

In fact, where a potential intercept receiver is relatively close to the transmitter and the intended receiver is relatively distant from the transmitter, a leakage IF signal received by the intercept receiver may have greater strength than the RF signal received by the more distant, intended receiver. A need has thus existed to achieve higher communication security in the face of this leakage problem.

SUMMARY OF THE INVENTION

A radio transmitter comprises a digital tuner for generating a modulated carrier signal as a bandpass signal or at baseband and means for generating at least one fixed local oscillator signal (FLO).

First means are provided for mixing the modulated carrier signal with the FLO signal to generate a filtered IF signal.

An analog IF unit has at least one IF stage to which the filtered IF signal is applied and from which another IF signal is output. A tunable local oscillator (TLO) generates a TLO signal of selectable frequency.

Second means are provided for mixing the another IF signal with the TLO signal to generate a radio frequency (RF) signal. The TLO and at least the digital tuner or the FLO generating means and the IF unit are controlled to generate the RF signal with RF hopping and with digital-tuner frequency hopping. The RF signal is processed for transmission.

BRIEF DESCRIPTION OF THE DRAWINGS

The accompanying drawings, which are incorporated in and constitute a part of this specification, illustrate a preferred embodiment of the invention and together with the description provide an explanation of the objects, advantages, and principles of the invention. In the drawings.

DESCRIPTION OF THE INVENTION

Figure 1:
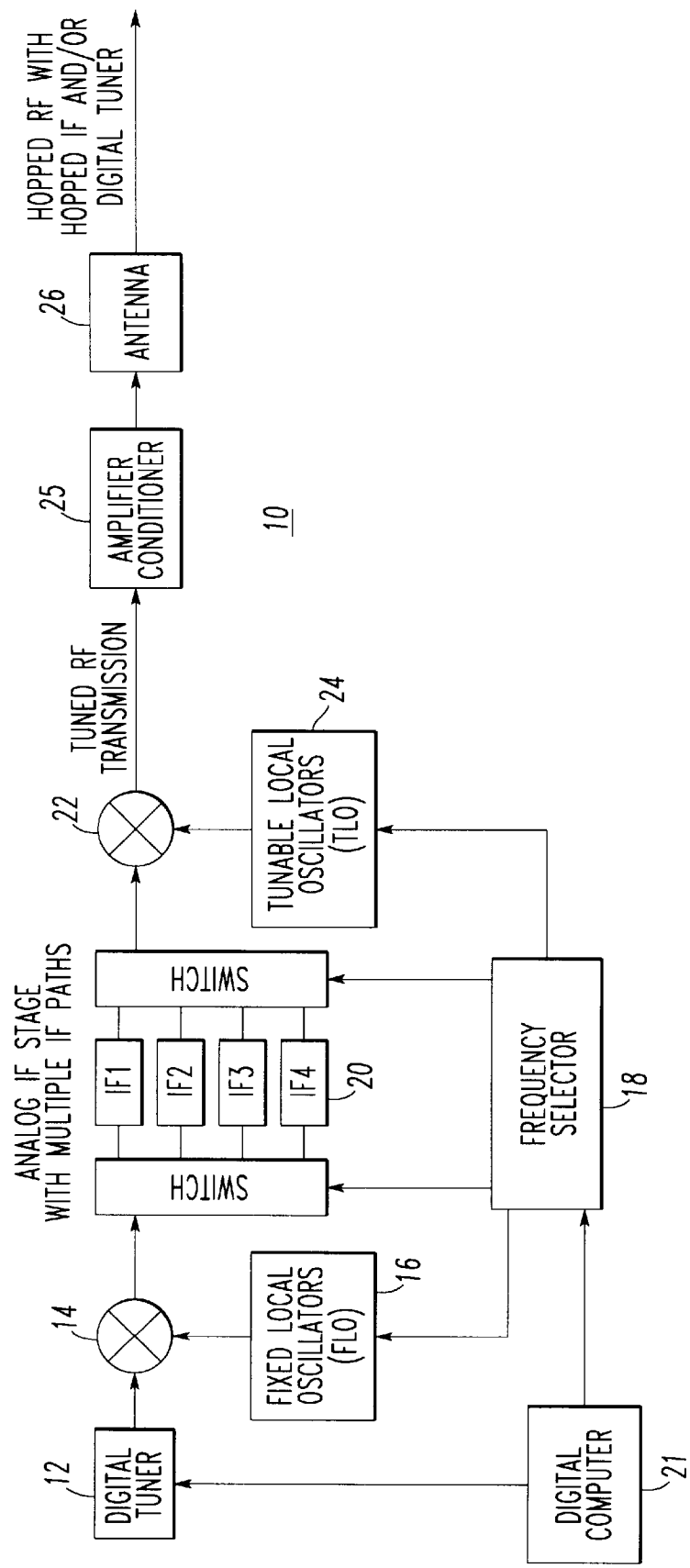
FIG. 1 is a block diagram representing an RF transmitter arranged in accordance with the invention.

The invention employs IF and/or digital-tuner frequency hopping in conjunction with conventional RF hopping to achieve significantly increased radio communication security. As shown in FIG. 1, an RF transmitter 10 has a transmit chain which generally represents various RF transmitters, and, in particular, represents the Northrop Grumman 2–2000 MHz Programmable Digital Radio.

Figure 3A:
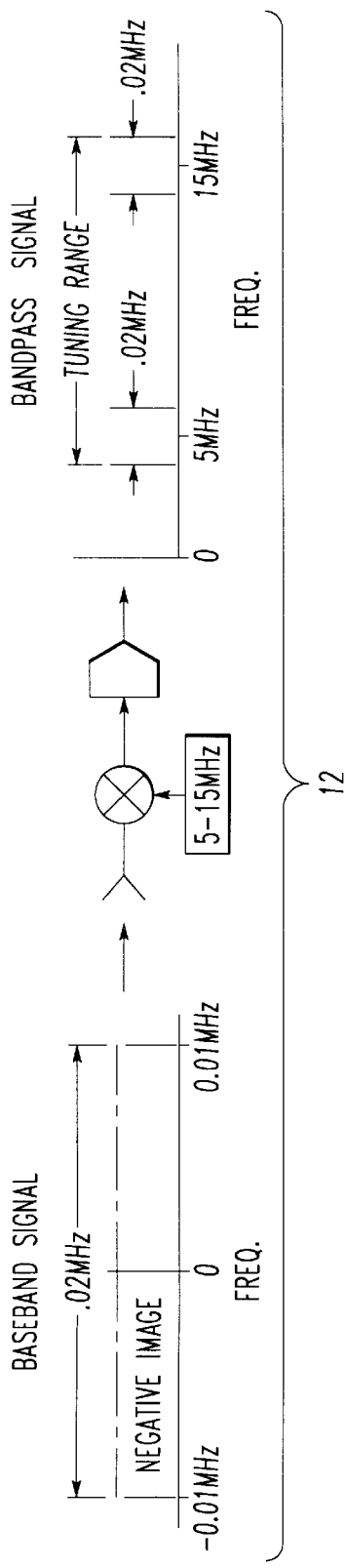
FIG. 3A is a graph illustrating baseband and bandpass signals.

The transmitter 10 includes a digital tuner 12 which generates a modulated carrier signal, either at baseband or, more commonly, around a band of frequencies offset from DC and referred to as a bandpass signal. FIG. 3A illustrates the concepts of baseband and bandpass signals.

Circuitry within the tuner 12 modulates information on the carrier waveform. The transmitter 10 further processes the modulated carrier signal to develop an RF signal for transmission.

The tuner 12 includes a digital/analog converter (not specifically shown) which enables the tuner to produce an analog output for coupling to a mixer 14. The frequency range of the tuner 12 may be, for example, 5 MHz to 15 MHz centered at 10 MHz. Baseband tuning would be −5 to +5 MHz.

A bank of fixed local oscillators 16 applies a single fixed LO (FLO) signal to the mixer 14 for mixing with the tuner output signal generated by a fixed frequency selector 18 preferably under control of a digital computer 21. A filtered IF output of the mixer 14 has a converted frequency value and is coupled to an IF unit 20 which has a single analog stage in this case, but which may generally have one or more stages. The particular IF generated (IF1, IF2, etc.) is determined by the combination of the tuner output signal frequency and the FLO signal frequency and is routed through a corresponding IF filter path.

An output of the IF unit 20 is applied to another mixer 22 for mixing with a TLO signal received from a tunable local oscillator (TLO) 24 and having a frequency determined by the TLO 24. The mixer generates an RF signal having a tuned RF determined in accordance with the operation of the TLO 24 and the digital tuner 12.

Figure 5:
FIG. 5 graphically represents a frequency spectrum which includes the tuning range of a radio receiver and a typical leakage IF frequency.

The tuned RF signal is applied to an amplifier/conditioner 25 which passes the tuned RF signal for transmission through an antenna 26 and provides filtering against IF leakage and other unwanted signals. However, transmitters are not perfect devices, and IF or other leakage signals will pass to the antenna 26 and be radiated. FIG. 5 graphically illustrates an example of the spectral spread between leakage IF and a typical receiver RF tuning range.

Figure 6:
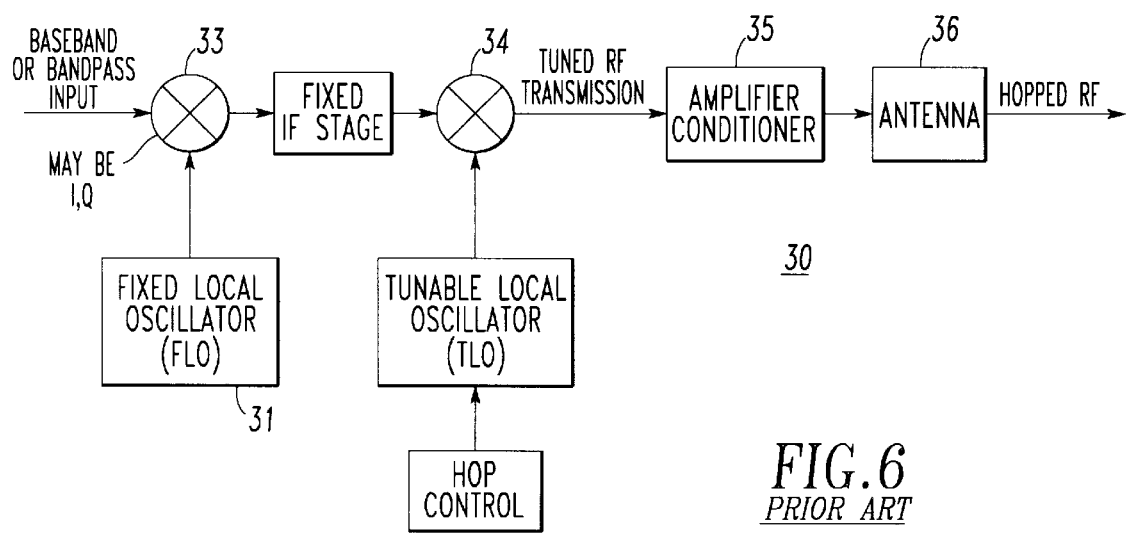
FIGS. 6 and 7 respectively represent prior art transmitters with IF leakage and baseband leakage.
Figure 7:
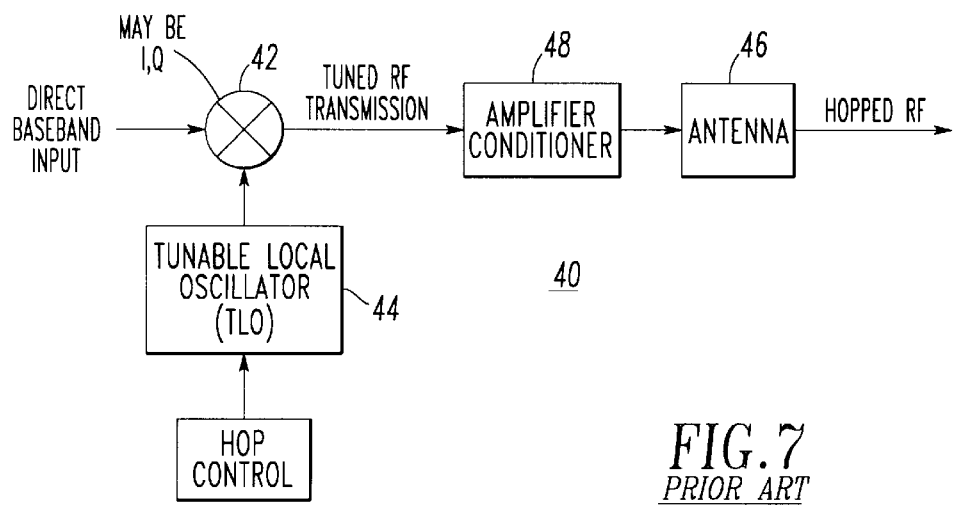

IF and baseband signal leakage has created problems in the prior art as indicated in the Background and as further illustrated in FIGS. 6 and 7. An RF hopping transmitter 30 in FIG. 6 employs a single stage IF transmit chain. An RF hopping transmitter 40 in FIG. 7 employs a transmit chain with direct baseband conversion.

The prior art transmitter 30 employs fixed local and tunable local oscillators 31 and 32 and mixers 33 and 34, and an antenna 36 radiates signals passed by an amplifier/conditioner 35. The prior art transmitter 40 employs a mixer 42 which mixes a direct baseband input with a TLO signal from a tunable local oscillator 44, and an antenna radiates signals passed by an amplifier/conditioner 48.

As indicated, the prior art transmitter 30 radiates hopped RF signals and fixed-frequency, leakage IF signals, and the transmitter 40 radiates hopped RF signals and fixed-frequency, leakage baseband signals. Since the leakage signals are fixed in frequency, potential intercept receivers can readily tune to them and exploit the communicated information contained therein.

Although the strength of the leakage signal is low relative to that of the hopped RF signals, an intercept receiver may be located much closer to the transmitter than an intended receiver such that the fixed leakage signal at the intercept receiver is at least as large as the hopped RF signal at the intended receiver. Thus, the hopped RF signal may be transmitted securely because of its hopping character, whereas the prior art leakage signal is intercepted to breach the overall communication security.

With reference again to the invention and FIG. 1, leakage signals are radiated by the antenna 26, but the character of the leakage signals is controlled to make them substantially secure against interception. Frequency hopping is applied to the IF unit 20 and/or the digital tuner 12 to secure communications from the transmitter 10 as a whole.

Accordingly, frequency hopping is applied to the IF unit and the digital tuner for combined IF and digital-tuner frequency hopping (FIG. 2C), the IF unit alone for only IF hopping (FIG. 2A), or the digital tuner alone for only digital-tuner frequency hopping (FIG. 2B) especially where only a single IF path is used.

The digital computer system 21 controls the TLO 24, through the frequency selector 18, for RF hopping; the FLO 16, through the frequency selector 18, for IF hopping; and the digital tuner 12 for digital-tuner frequency hopping. The invention provides significantly improved radio communication security over conventional RF-only hopping, by a combination of RF hopping with IF hopping or digital-tuner frequency hopping or both IF and digital-tuner frequency hopping. To implement IF hopping, the IF unit 20 includes a plurality of selectable bandpass filters, in this case four bandpass filters IF1, IF2, IF3, and IF4. Each IF filter has a characteristic IF based on its pass band. Suitable switches 21 and 23 are controlled to hop from IF filter to IF filter in accordance with a random pattern, and, thereby, with proper FLO frequency signals, to provide corresponding sequential combinations of IF frequency signals. Any radiated leakage IF signals thus hop in accordance with the random pattern.

Figure 2A:
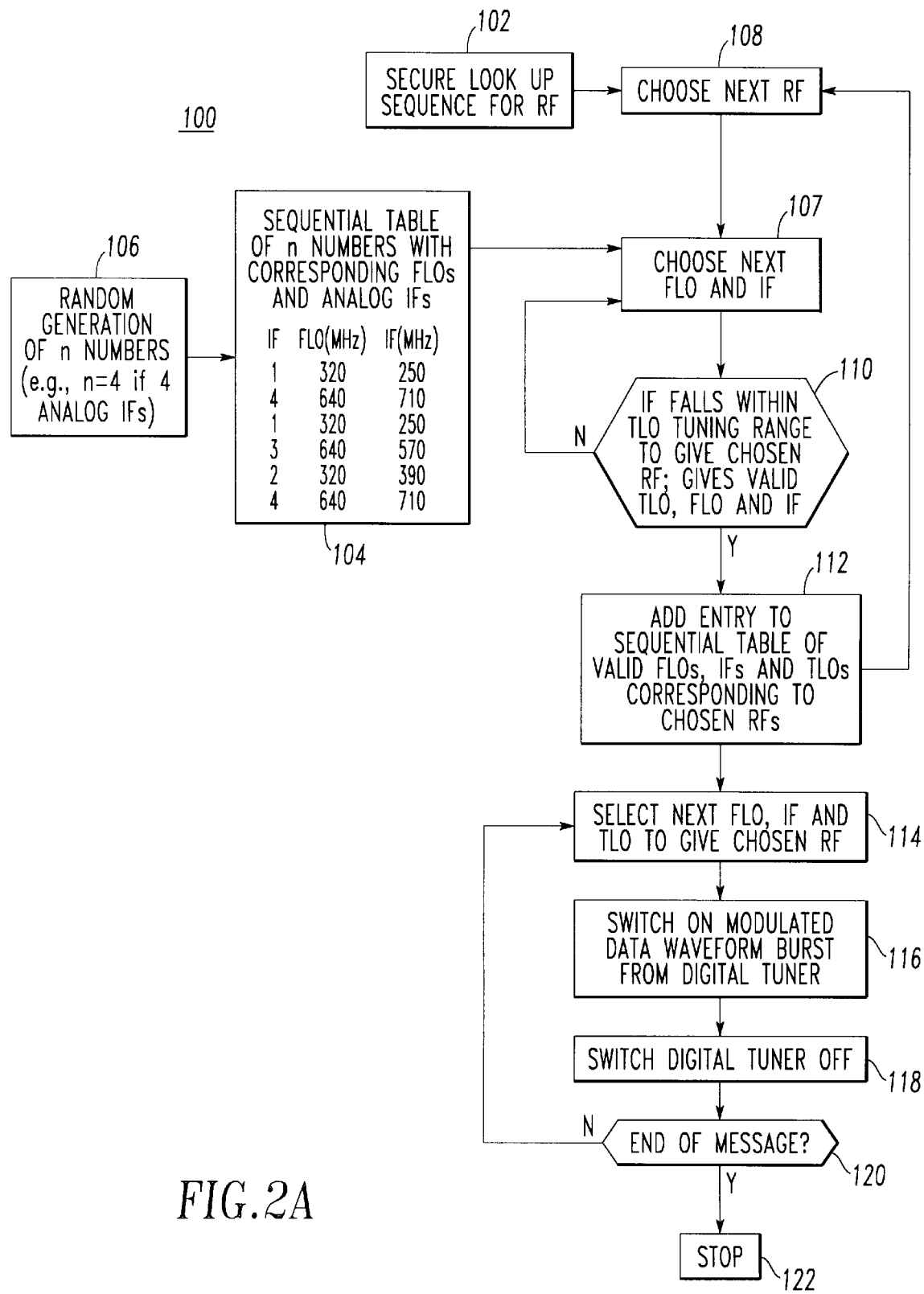
FIG. 2A is a logic flow diagram employed in an analog IF hopping embodiment and executed by a digital computer system included in the transmitter of FIG. 1.
Figure 3B:
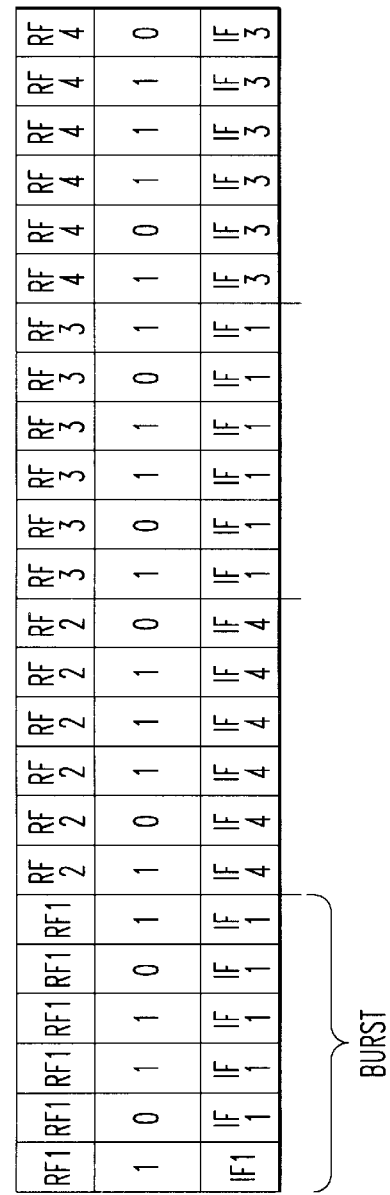
FIG. 3B is a graphical representation of a bit stream in an RF signal transmitted with frequency hopping in correspondence to an IF hop table employed in the embodiment of FIG. 2A.

FIG. 3B graphically illustrates the manner in which IF frequency hopping is embedded in a transmitted bit stream. The hopping RF and IF frequencies are designated respectively in the upper and lower rows of the illustration. An RF hop table applies to this example as considered subsequently herein in connection with FIG. 2A.

The invention significantly decreases the ability of an intercept or unfriendly receiver to exploit the IF signal leakage out of the transmitter through intermediate frequency hopping. At the same time, the intended receiver can receive a transmitted communication since the combined IF and TLO frequency signals hop to produce an RF hopping pattern that is known to the intended receiver. As previously indicated, the digital tuner 12 can also be controlled to hop digitally tuned inputs in accordance with the invention, and similar comments apply to the communication security thus achieved.

In order to transmit the same RF with the use of different IFs, i.e., hopped IFs, the TLO 24 tunes over a relatively wide range, such as approximately 60 to 2000 MHz. Thus, a particular RF, such as 300 MHz, can be obtained with TLO/IF combinations of 550/250, 690/390 or 1190/890.

In operation of the invention, it is not necessary for every RF to use more than one TLO/IF combination. It is only necessary that multiple combinations of TLO/IF be available for a portion of the RFs in a frequency hopping radio. For example, due to "birdie" signal considerations, multiple TLO/IF combinations may be viable at RFs between 225 and 350 MHz but not at RFs between 350 and 400 MHz.

When a random RF hop pattern is chosen for the military band between 225 and 400 MHz, a particular IF may always be used when transmitting between 325 and 400 Mhz such that there is an overall random IF hop pattern. However, different IFs can be used when transmitting between 225 and 400 MHz such that an overall random hop pattern exists. Even if a particular IF is used more than other IFs, it is still virtually impossible for an unfriendly receiver to recover all of the information in a transmission by monitoring only one or some of the IFs.

In order to monitor transmitted IF leakage of the transmitter LO, several intercept or unfriendly receiver channels must simultaneously monitor several IFs and combine resultant outputs into a single information stream. The invention thus makes it very difficult to breach communication security through intercepted IF leakage signals.

Furthermore, as previously indicated, in many cases, and particularly for relatively narrowband signals, the invention can provide alternative or additional frequency scrambling by means of digital tuner frequency hopping. The same IF path can often be used as the digital tuner is hopped over its relatively wide range, thereby providing digital-tuner frequency hopping only. However, two or more IF paths may be needed to cover the full RF hopping range in conjunction with the TLO and without extraneous spurious signals, and, in this case, multiple IF paths can provide range coverage for digital-tuner frequency hopping with or without IF hopping.

The IF bandwidths are wide relative to the instantaneous information bandwidth and also to the step size of the TLO 24. The digital tuner 12 (which contains a digital/analog converter to produce an analog output) and the TLO 24 can be operated to achieve different frequencies within the overall IF bandwidth of a single path, yet still produce the same RF.

For example, to achieve IF filter simplicity, an IF bandwidth may typically be 20 MHz or more. Thus, if digital tuner hopping is also employed over the entire IF passband, the bandwidth of the unfriendly receivers must be increased in the ratio of IF-to-signal bandwidth, which is typically 30 dB or more. The unfriendly receiver thus has to be more complex and its signal-to-noise ratio is significantly degraded. In this manner, the invention provides even further communication security.

Figure 2B:
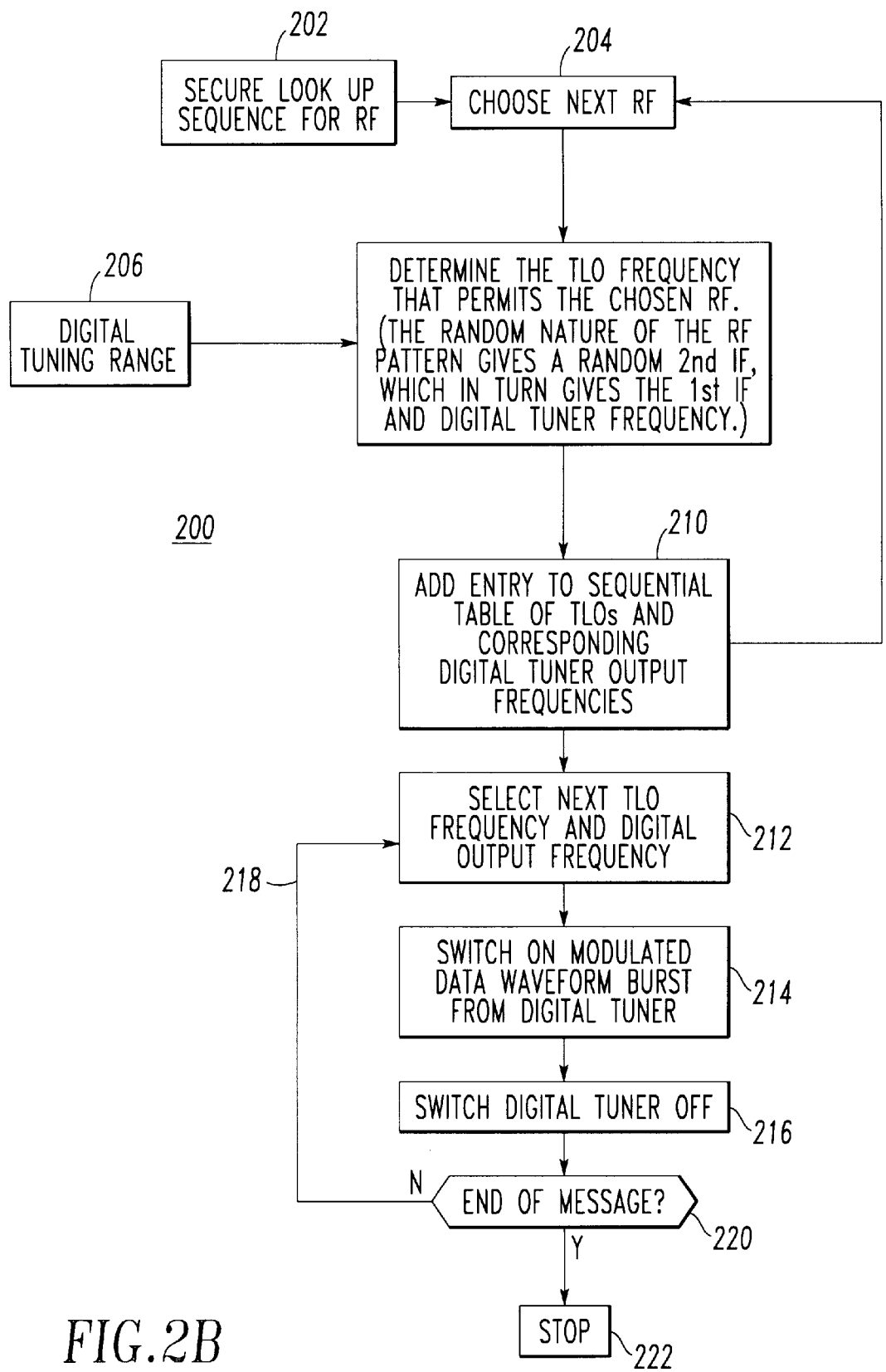
FIG. 2B is a logic flow diagram employed in a digital-tuner frequency hopping embodiment and executed by the digital computer system included in the transmitter of FIG. 1.
Figure 2C:
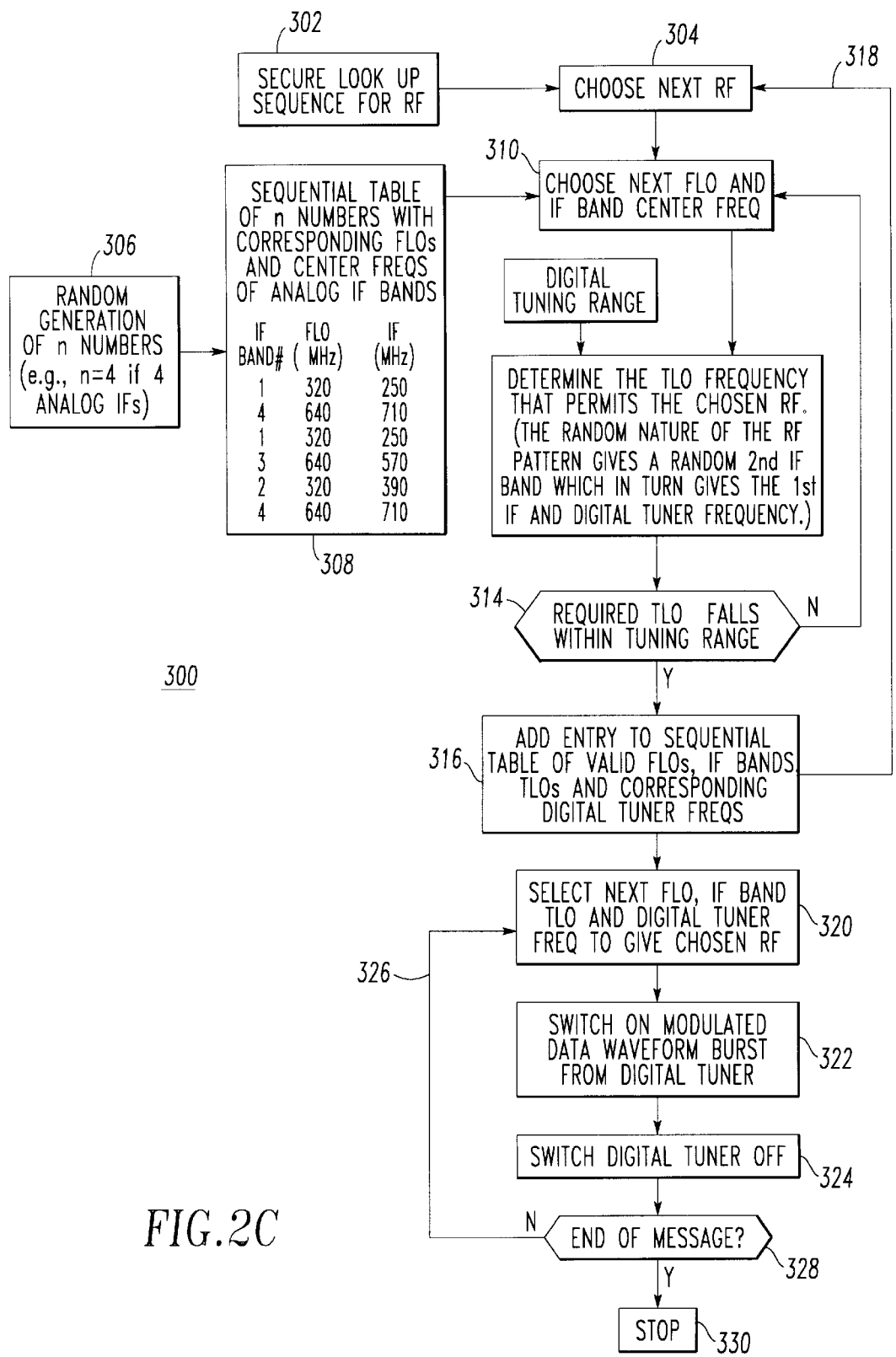
FIG. 2C is a logic flow diagram employed in combined IF and digital-tuner frequency hopping embodiment and executed by the computer system included in the transmitter of FIG. 1.

The computer system 21 is programmed to implement logic flow for control of IF hopping, digital-tuner frequency hopping, and the combination of IF and digital-tuner frequency hopping, as well as the conventional RF hopping in different embodiments of the invention, including embodiments represented by the respective block diagrams in FIGS. 2A, 2B and 2C.

Figure 3C:
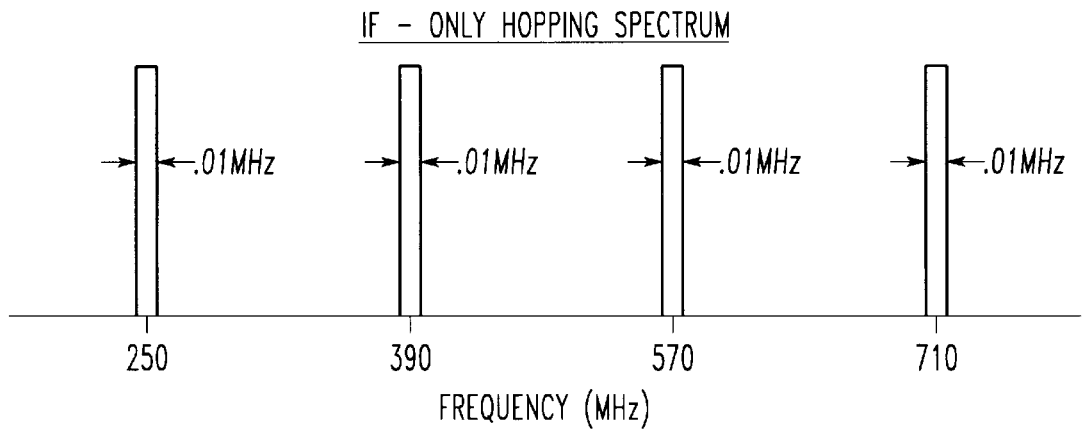
FIGS. 3C, 3D, and 3E respectively illustrate IF hopping, digital-tuner frequency hopping.
Figure 4A:
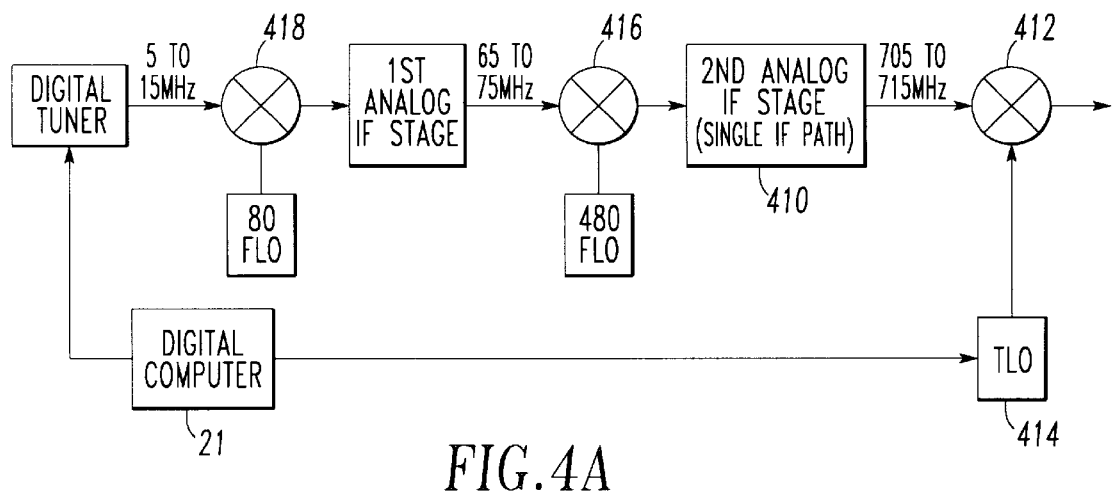
FIG. 4A is a schematic diagram of a transmitter which employs digital-tuner frequency hopping operation of the embodiment of FIG. 2B.
Figure 4B:
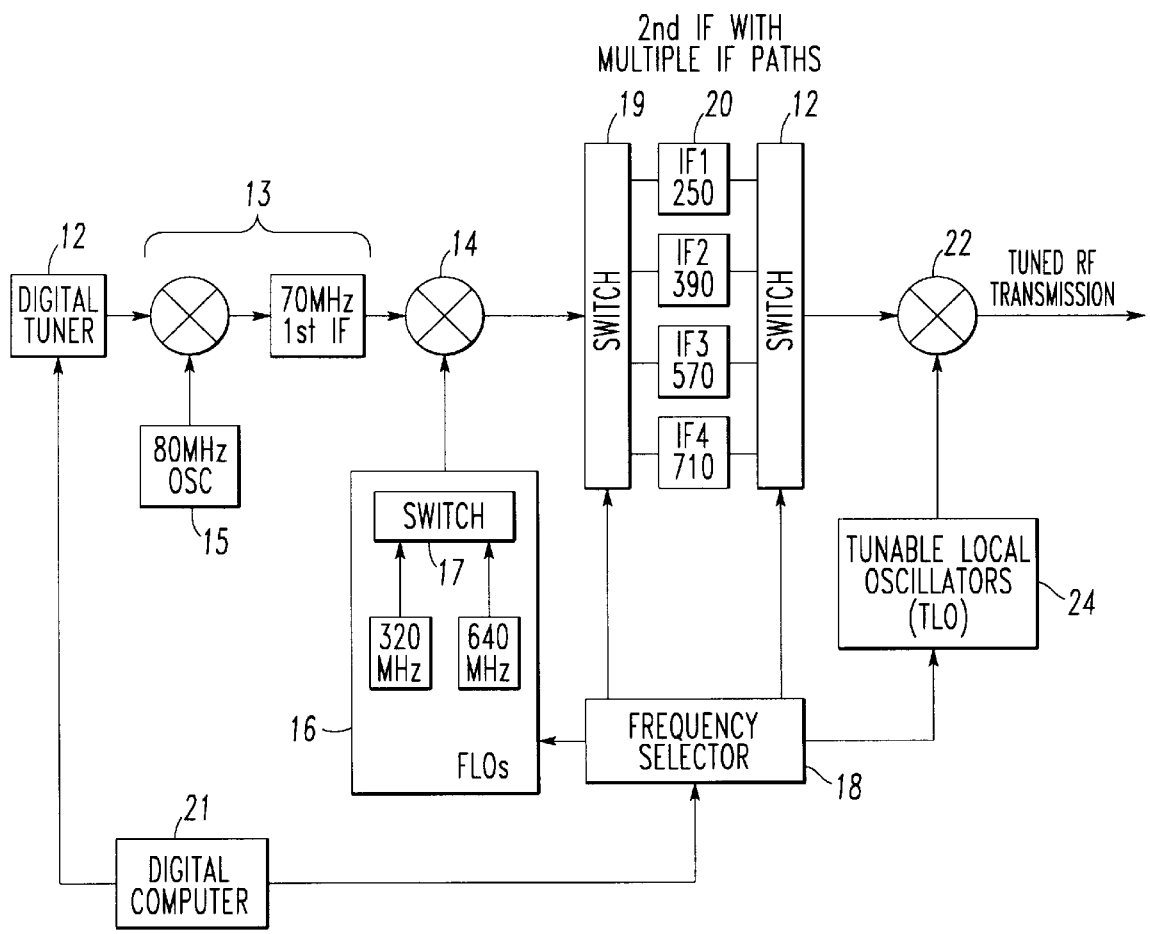
FIG. 4B is a schematic diagram of a transmitter which employs IF hopping operation operable in the IF hopping embodiment of FIG. 2A or the combined IF and digital-tuner frequency hopping embodiment of FIG. 2C.

FIG. 2A shows a block diagram 100 for the preferred logic flow when only the analog IFs are hopped. FIG. 4B shows a transmitter in which IF-only hopping can be embodied. The concept of IF-only hopping is illustrated by the graph in FIG. 3C.

In FIG. 4B, elements like those in FIG. 1 have the same reference characters. A first IF conversion stage 13 is connected between the output of the digital tuner 12 (e.g., at 10 MHz) and the bank of multiple IF paths in the IF stage 20 which is, in this case, a second IF stage, to upconvert the digital tuner output (e.g., to 70 MHz). A modulated frequency at 70 MHz, referred to as the first IF, is input to the mixer 14.

With reference again to FIG. 2A, a secure lookup table sequence of radio frequencies is accessed for an RF hopping pattern indicated by block 102. A random sequence of FLOs is generated by block 104 to produce a corresponding sequence of IFs through the mixer 14. Numbers are randomly generated for the table in the block 104, as indicated by block 106.

For example, four random numbers may be generated as shown, with each number corresponding to a FLO and a second IF path, with each IF path referred to by an "IF #". Paired FLO and IF values are chosen in block 107 and compared to an RF chosen in block 108. The combination of FLO and IF values requires a TLO frequency that can produce the chosen RF in the mixer 22 according to well known mixing rules.

If a TLO frequency is required which does not fall within the TLO tuning range, i.e., the TLO is not valid, additional FLOs and corresponding IFs are chosen until a "valid" FLO/IF combination produces the chosen RF as indicated in block 110.

As represented by block 112, the above described process is repeated in loop 111 to produce a sequential table of valid FLOs, IFs, and corresponding TLOs for storage in a memory of the computer 21. This table defines the IF hopping selections. If necessary or desired, the table production process can be repeated offline during message transmission to avoid a bottleneck which otherwise would cause wait time for an outgoing message burst while a next valid FLO/IF combination is determined.

The currently valid IF and FLO values are selected, as indicated by block 114, by the frequency selector 18 under computer control. The switches 19 and 23 are operated to select the next valid IF, and the switch 17 is operated to select the proper fixed oscillator (320 or 640 MHz, in this example) in the FLOs bank 16.

Under computer control, the frequency selector 18 also selects the next valid TLO in conjunction with the FLO selection in the block 114. As indicated by block 116, the modulated data waveform is switched ON and then OFF over a short time period as indicated by blocks 116 and 118 and as determined by the apriori message burst time between RF hop cycles for the communication link format of interest. If the message is not completed after the current burst, the next FLO, IF, and TLO combination are selected, as described above, and the next burst is transmitted through the amplifier/conditioner 25 and the antenna 26. The described process is repeated until the message ends (block 120), at which point the transmission is stopped (block 122).

In the described example, the TLO 24 may possess a sufficiently fine step size to produce the desired RF channel spacing. If not, incremental fine tuning can be accomplished through the digital tuner 12, where each IF has a sufficiently wide bandpass to accommodate such digital tuning. If, for example, the TLO step size is 0.1 MHz, the IF bandpass and digital tuning range need only be slightly wider than 0.1 MHz.

Alternatively, a random number table can replace the random generation of n numbers (block 106) with use of a conventional software algorithm. Although such a software algorithm permits an effective infinite random number sequence which never repeats over the time frame of interest, it also makes it unnecessary to secure the random sequence from undesired radio receivers because the hopped IF sequence is not known in advance even to the IF hopping transmitter.

An operator can also insert a random seed to start the hopping sequence and provide additional randomization.

The intended radio receiver receives the much stronger hopped RF signal, and thus need not know the random IF hop pattern for reception of the weaker leakage IF signal.

Figure 3D:
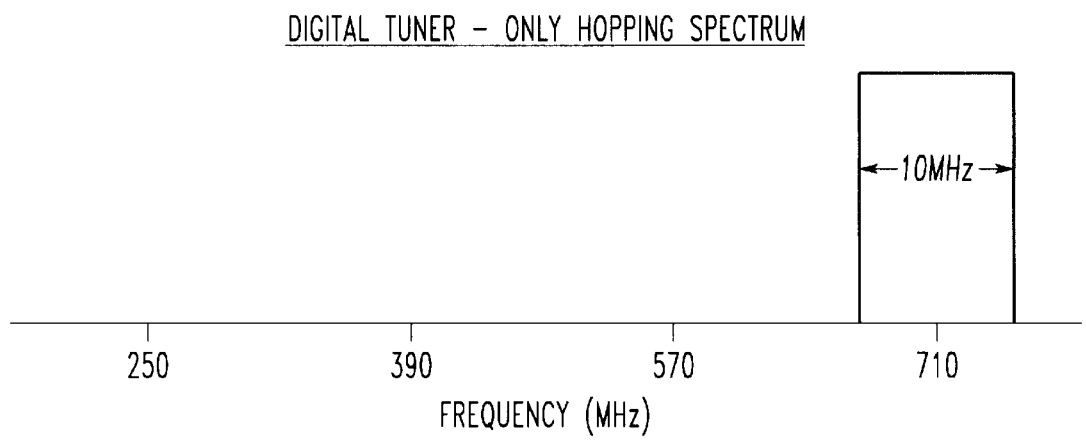

The digital tuner can also be hopped, either separately without IF hopping, or in combination with IF hopping, to produce even greater security against communication breach through additional spreading of the IF leakage signal. Separate digital-tuner frequency hopping (i.e., without IF hopping) is applied in the embodiment of FIG. 2B and is conceptually illustrated by the graph of FIG. 3D.

In the relatively simple case (see FIG. 4A) where only a single FLO is selected to produce a single analog 2nd IF stage, the combination of the 2nd IF stage 410 and one of the TLO frequencies in the TLO 414 will produce any desired RF output through the mixer 412. If not, another IF is employed, but a single 2nd IF (i.e., there is no IF path hopping) is assumed to simplify this explanation of the invention. FIG. 4A accordingly refers only to digital-tuner frequency hopping.

Available IF bandwidth is defined as the band of frequencies which can pass the modulated waveform in an undistorted manner. The available 2nd IF bandwidth must be at least as wide as the width of the digital tuning plus the bandwidth of the modulated carrier signal which is typically negligibly small.

For example, the digital tuning range may be 5 to 15 MHz, i.e., 10 MHz wide, the bandwidth of the modulated carrier signal may be 0.02 MHz or less, and the available 2nd IF bandwidth may be 20 MHz. If a 1st IF stage is employed as shown in FIG. 4A, its bandwidth must also be greater than the tuning range of the digital tuner plus the bandwidth of the modulated carrier signal.

Thus, the digital tuner can be fine stepped over a band (10 MHz in this example) to produce analog IFs which can be anywhere within a 10 MHz band. With a widened range of possible analog IFs, an unintended receiver monitoring LO leakage, must widen its bandwidth over and above the bandwidth of the modulated carrier signal and thereby decrease its sensitivity to receive a complete message.

Typically, the smallest TLO step size is much narrower than the IF bandwidth. However, for the purposes of the invention, it is preferred to maintain a relatively large, or coarse, TLO step size in order to achieve a wide range in 2nd IF frequencies while frequency hopping. For example, if the TLO steps are so fine that the desired RF could always be achieved in the mixer 412 by using a 2nd IF input of 710 MHz, there would be no need to tune the digital tuner away from 10 MHz, and the result would be a constant 2nd IF of 710 MHz. Thus, an unintended receiver could increase sensitivity on IF leakage by narrowing its detection bandwidth around 710 MHz.

The TLO step size should be approximately equal to the digital tuning range for best results. In this example, the digital tuning range is 10 MHz and the TLO steps are even multiples of 10 MHz. If, for design purposes, the TLO step size had to be another value, such as 9.9 MHz, the effective width of the random IF frequency band would be 9.9 MHz which is negligibly different from 10 MHz.

A secure lookup table 202, which is constructed according to well known rules associated with communication security, provides a sequence of radio frequencies for RF hopping as shown in a logic diagram 200 for only digital-tuner frequency hopping in FIG. 2B. The lookup sequence controls the RF hop pattern.

According to security procedures provided elsewhere, one of the table RFs is chosen for the first burst of modulated data, and thereafter the next RF is chosen for the next burst of modulated data as indicated by block 204. With a digital tuning range (block 206) of 5 to 15 MHz (FIG. 4A), the 1st IF can be from 65 to 75 MHz, and the 2nd IF can be from 705 to 715 MHz. Finally, a corresponding TLO frequency, as determined by the chosen RF, produces the chosen RF output, as indicated by block 208.

For example, the chosen RF may be 86.230 MHz. Since the minimum 2nd IF is 705 MHz, the minimum TLO frequency for high side injection in the mixer 412 is 791.200 MHz. Similarly, the maximum 2nd IF is 715 MHz, and the maximum TLO frequency for high side injection is 801.230 MHz. With the TLO steps restricted to multiples of 10 MHz, the TLO frequency must be 800 MHz. To provide an RF output of 86.230, the 2nd IF must equal 800 minus 86.230 or 713.770 MHz. A fixed LO of 640 at the mixer 416 requires a 1st IF of 713.77 minus 640 or 73.770 MHz. Likewise, a fixed LO of 80 MHz at the mixer 418 requires a digital tuner output of 80 minus 73.770 or 6.230 MHz.

Since the RF hop pattern is chosen in a random manner, the digital tuning output, and hence the 2nd IF signal (which leaks out in transmission), is also random across a range which is 10 MHz wide.

As indicated by block 210, the above described process is repeated until a sequential table of valid TLOs and corresponding digital tuner output frequencies is determined. This table defines the digital tuner hopping selections. The table determination process can be repeated offline during message transmission to avoid a bottleneck where the outgoing message burst must wait for the next valid combination.

Block 212 in FIG. 2B provides for computer (FIG. 4A) selection of the next TLO frequency and digital tuner output frequency. After selection, the modulated data waveform is switched ON (block 214) and then OFF (block 216) as determined by the apriori burst time between RF hop cycles. If the message is not completed after the burst, the next FLO, IF, and TLO is selected as described above, and the next burst is transmitted. The software cycles through loop 218 until the message ends as indicated by block 220, at which point the transmission is stopped (block 222).

Figure 3E:
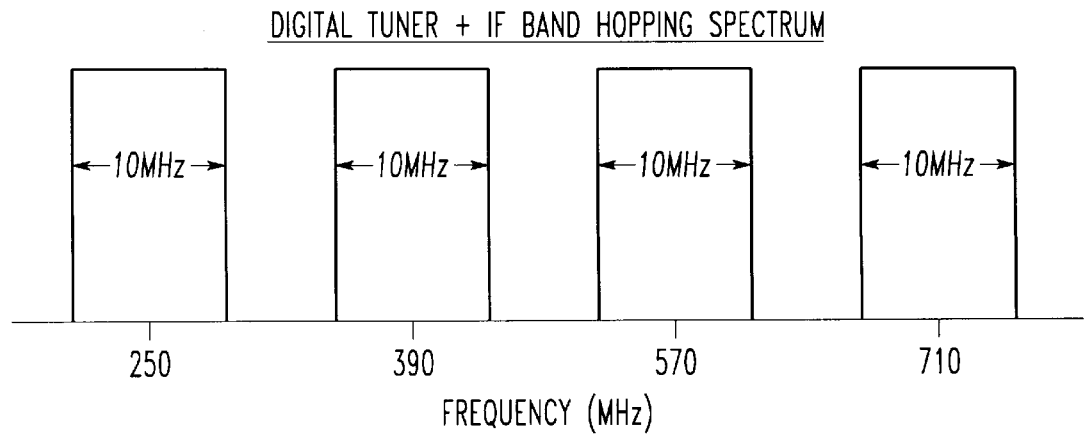

In applying the invention, 2nd IF band hopping can be combined with digital tuner hopping to force an unintended receiver station to listen on multiple IF bands with relatively wide (e.g., 10 MHz) receiver bandwidths. A logic flow diagram 300 for these combined hoppings is shown in FIG. 2C, and the apparatus block diagram shown in FIG. 4B applies to combined hopping operation as well as the previously described IF-only hopping. The combined hopping concept is illustrated by the graph shown in FIG. 3E.

Again, a secure lookup table sequence of radio frequencies 302 is available for controlling the RF hopping pattern. The next RF is chosen for the next data burst (which is the first RF for the initial selection), as indicated by block 304. A FLO and a 2nd IF band center are then chosen randomly (blocks 306, 308, and 310) in a manner similar to that described for FIG. 2A. In this case, however, the actual 2nd IF will usually be different from the 2nd IF band center because the digital tuning frequency will usually be offset from the center of its range.

As an illustration of TLO determination in blocks 312 and 314, the next IF band may be band #4 with a center frequency of 710 MHz and a possible range of 705 to 715 MHz. With a chosen RF of 86.230 MHz and with TLO steps restricted to 10 MHz as previously described, the TLO frequency is 800 MHz. A check (block 314) is then made to determine whether this TLO frequency falls within the TLO tuning range.

In the case of FIG. 2B, the single 2nd IF is assumed always to give a valid TLO within its tuning range. However, in the embodiment of FIG. 2C, multiple IF bands are being hopped, and some of them may not be able to generate a valid TLO frequency for the chosen RF. The block 314 provides the required test for validity.

Since an RF output of 86.230 is required, the 2nd IF must equal 800 minus 86.230 or 713.770 MHz. A fixed LO of 640 at the mixer 416 requires a 1st IF of 713.77 minus 640 or 73.77 MHZ. Similarly, a fixed LO of 80 MHz at the mixer 418 requires a digital tuner output of 80 minus 73.770 or 6.230 MHz.

With the RF hop pattern chosen in a random manner, the digital tuner output, and hence the 2nd IF signal (which leaks out in transmission) will also be random across a range which is 10 MHz wide. By restricting the TLO to a coarse step size 10 MHz steps in this example) the hopping RF selections automatically hop the digital tuner output.

The values determined in blocks 312 and 314 are entered (block 316) in the sequential table of valid FLOs, IF bands, TLOS, and corresponding digital tuner output frequencies. In blocks 304 and 306, another RF is then chosen along with the next FLO and corresponding IF band.

The described process is repeated in software loop 318 until the table is completed. As previously, the table generation process can be performed offline for the reasons previously given.

In block 320, the next FLO, IF band, TLO, and corresponding digital tuner output frequency are selected. After this selection, the modulated data waveform is switched ON and OFF (blocks 322 and 324) as in the previously described logic diagrams. The software operating in the computer 21 (FIG. 4B) cycles in loop 326 until the message ends at block 328, at which point the transmission is stopped (block 330).

The foregoing description of the preferred embodiment has been presented to illustrate the invention without intent to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A radio transmitter comprising:
    a digital tuner for generating a modulated carrier signal as a bandpass signal or at baseband;
    means for generating at least one fixed local oscillator signal (FLO);
    first means for mixing the modulated carrier signal with the FLO signal to generate a filtered IF signal;
    an analog IF unit having at least one IF stage to which the filtered IF signal is applied and from which another IF signal is output;
    a tunable local oscillator (TLO) for generating a TLO signal of selectable frequency;
    second means for mixing the another IF signal with the TLO signal to generate a radio frequency (RF) signal;
    means for controlling the TLO and at least the digital tuner or the FLO generating means and the IF unit to generate the RF signal with RF hopping and with digital-tuner frequency hopping and/or IF hopping; and
    means for processing the RF signal for transmission.

2. The transmitter of claim 1 wherein the one IF stage of the IF unit has a plurality of IF filter paths, the FLO generating means generates at least two selectable FLO signals having different frequencies, and the controlling means controls the FLO generating means and one IF stage to generate the RF signal with IF hopping.

3. The transmitter of claim 2 wherein the controlling means further controls the digital tuner to generate the RF signal with digital-tuner frequency hopping in addition to the IF hopping.

4. The transmitter of claim 2 wherein the IF unit has at least a first IF stage and a second IF stage and wherein the second IF stage is the one IF stage.

5. The transmitter of claim 2 wherein the one IF stage has at least four IF filter paths and wherein the IF unit further includes switching means controlled by the controlling means to direct the filtered IF signal through one of the IF paths according to the frequency of the FLO signal.

6. The transmitter of claim 2 wherein the controlling means selects an RF signal for RF hopping, selects FLO and IF values randomly from a sequential table of FLO and IF values, and enters selected FLO and IF values, valid for selected RF signals, in another sequential table, and sequentially executes the valid FLO and IF values in the another sequential table for hopping of transmitted leakage IF signals.

7. The transmitter of claim 1 wherein the controlling means controls the digital tuner so that the RF signal is generated with digital-tuner frequency hopping.

8. The transmitter of claim 7 wherein the controlling means determines each TLO frequency which permits each RF in the RF sequence, and determines corresponding digital-tuner output frequencies for hopping of transmitted digital-tuner leakage signals.

9. The transmitter of claim 1 wherein the controlling means includes a digital computer programmed to provide control as defined.

10. A method for transmitting radio signals comprising the steps of:
    generating a modulated carrier signal as a bandpass signal or at baseband;
    generating at least one fixed local oscillator signal (FLO);
    mixing the modulated carrier signal with the FLO signal to generate a filtered IF signal;
    applying the filtered IF signal to an analog IF unit having at least one IF stage from which another IF signal is output;
    generating a TLO signal of selectable frequency;
    mixing the another IF signal with the TLO signal to generate a radio frequency (RF) signal;
    controlling the TLO generation and at least the modulated carrier signal generation or the FLO generation and the IF unit to generate the RF signal with RF hopping and with digital-tuner frequency hopping and/or IF hopping; and
    processing the RF signal for transmission.

11. The method of claim 10 wherein the one IF stage of the IF unit has a plurality of IF filter paths, at least two selectable FLO signals having different frequencies are generated, and the FLO generation and the one IF stage are controlled to generate the RF signal with IF hopping.

12. The method of claim 10 wherein the modulated carrier signal generation is controlled so that the RF signal is generated with digital-tuner frequency hopping.

* * * * *